US010133305B1

(12) United States Patent
Sullivan et al.

(10) Patent No.: US 10,133,305 B1
(45) Date of Patent: Nov. 20, 2018

(54) FACIAL-INTERFACE SYSTEMS FOR HEAD-MOUNTED DISPLAYS

(71) Applicant: Oculus VR, LLC, Menlo Park, CA (US)

(72) Inventors: Joseph Patrick Sullivan, Seattle, WA (US); Shane Michael Ellis, Bellevue, CA (US)

(73) Assignee: Oculus VR, LLC, Menlo Park, CA (US)

( * ) Notice: Subject to any disclaimer, the term of this patent is extended or adjusted under 35 U.S.C. 154(b) by 0 days.

(21) Appl. No.: 15/495,775

(22) Filed: Apr. 24, 2017

(51) Int. Cl.
*G06F 1/16* (2006.01)
(52) U.S. Cl.
CPC ............ *G06F 1/163* (2013.01); *G06F 1/1637* (2013.01)
(58) Field of Classification Search
None
See application file for complete search history.

(56) References Cited

U.S. PATENT DOCUMENTS

| 3,012,283 | A | 12/1961 | Foster et al. | |
|---|---|---|---|---|
| 4,241,131 | A | 12/1980 | Bailey | |
| 8,605,008 | B1* | 12/2013 | Prest | G02B 27/0176 345/7 |
| 9,332,337 | B2* | 5/2016 | Ridler | H04R 1/1066 |
| 9,778,467 | B1* | 10/2017 | White | G02B 27/0176 |

| 2006/0154567 | A1 | 7/2006 | Jung-Shun | |
|---|---|---|---|---|
| 2006/0179554 | A1* | 8/2006 | Barton | A61F 9/026 2/426 |
| 2009/0287282 | A1* | 11/2009 | Biser | A61F 7/02 607/109 |

(Continued)

OTHER PUBLICATIONS

Joseph Patrick Sullivan et al.; Facial-Interface Cushion, System, and Method for Head-Mounted Displays; U.S. Appl. No. 15/616,539, filed Jun. 7, 2017.

(Continued)

*Primary Examiner* — Courtney Smith
*Assistant Examiner* — Rashen E Morrison
(74) *Attorney, Agent, or Firm* — FisherBroyles, LLP

(57) ABSTRACT

A detachable head-mounted-display cushion may include a cushion layer having a user-side surface dimensioned to abut a facial portion of a user and a display-side surface dimensioned to abut a mounting surface of a facial-interface system for a head-mounted display. The detachable head-mounted-display cushion may also include a magnetic-coupling mechanism configured to removably attach the cushion layer to the mounting surface of the facial-interface system. A corresponding head-mounted-display system may include a head-mounted display, a facial-interface mounting member for the head-mounted display, a cushion layer abutting the facial-interface mounting member, and a magnetic-coupling mechanism removably attaching the cushion layer to the facial-interface mounting member. A method may include positioning a cushion layer abutting a facial-interface mounting member for a head-mounted display and removably attaching the cushion layer to the facial-interface mounting member with a magnetic-coupling mechanism. Various other head-mounted-display cushions, head-mounted-display systems, and methods are also disclosed.

16 Claims, 7 Drawing Sheets

(56) References Cited

U.S. PATENT DOCUMENTS

| | | | |
|---|---|---|---|
| 2011/0225709 A1* | 9/2011 | Saylor | A61F 9/025 2/431 |
| 2012/0070027 A1* | 3/2012 | Ridler | H04R 1/1058 381/374 |
| 2012/0255104 A1* | 10/2012 | Didier | A61F 9/025 2/426 |
| 2014/0139407 A1* | 5/2014 | Abdollahi | G02B 27/0176 345/8 |
| 2015/0238361 A1* | 8/2015 | McCulloch | A61F 9/029 2/435 |
| 2017/0090514 A1* | 3/2017 | Byun | G06F 1/166 |
| 2017/0094816 A1* | 3/2017 | Yun | G02B 27/022 |
| 2017/0255019 A1* | 9/2017 | Lyons | G02B 27/0172 |

OTHER PUBLICATIONS

Joseph Patrick Sullivan et al.; Facial-Interface Cushion, System, and Method for Head-Mounted Displays; U.S. Appl. No. 15/594,263, filed May 12, 2017.

Flextech, Inc.; About Compression Molding; http://www.flextechfoam.com/production-capabilities/compression-molding/; as accessed Jun. 20, 2017.

Basf; Thermoplastic Polyurethane Elastomers (TPU)—Elastollan—Material Properties; http://www.polyurethanes.basf.de/pu/solutions/us/function/conversions:/publish/content/group/Arbeitsgebiete_und_Produkte/Thermoplastische_Spezialelastomere/Infomaterial/elastollan_material_uk.pdf, Nov. 2011.

New Oculus Rift Facial Interfaces with Replacement Foam Pads; https://www.kickstarter.com/projects/1869563556/new-oculus-rift-facial-interfaces-with-replacement; as accessed Jun. 20, 2017 (dated Jul. 6, 2016).

VR Cover; Oculus Rift Facial Interface & Foam Replacement Standard Set; https://vrcover.com/product/oculus-rift-facial-interface-foam-replacement-standard-set-2/; as accessed Jun. 20, 2017.

Greenbaum; Sport / Hygienic Interface for Head Mounted Display; https://nyvirtualreality.wordpress.com/2014/02/26/sport-hygienic-interface-for-head-mounted-display/; as accessed Jun. 20, 2017 (dated Feb. 26, 2014).

Greenbaum; Exercise HMD: Update; https://nyvirtualreality.wordpress.com/2014/04/07/exercise-hmd-update/; as accessed Jun. 20, 2017 (dated Apr. 7, 2014).

UFP Technologies; Reticulated Polyurethane Foam; https://www.ufpt.com/materials/foam/reticulated-polyurethane-foam.html?utm_source=google&utm_medium=cpc&utm_term=reticulated%252Bfoam&utm_content=polyurethane-foam&utm_campaign=foam&gclid=CI2Xj4Do6tMCFQ5xfgodxIQOpg; as accessed Jun. 20, 2017.

* cited by examiner

FACIAL-INTERFACE SYSTEMS FOR HEAD-MOUNTED DISPLAYS

BACKGROUND

Virtual reality head-mounted displays have wide applications in various fields, including engineering design, medical surgery practice, military simulated practice, and video gaming. For example, virtual reality head-mounted displays may allow users to experience realistic, immersive virtual environments while playing video games, during flight simulation training, or when interacting with co-workers around the globe.

Virtual reality head-mounted displays often include cushioned facial-interface systems that enable users to comfortably position the head-mounted displays on their faces. However, the cushioning of facial-interface systems may become worn and dirty over time. Additionally, a particular cushioned facial-interface system may not comfortably fit users of various head or face shapes or users who wear glasses while wearing the head-mounted displays.

SUMMARY

As will be described in greater detail below, the instant disclosure generally relates to facial-interface systems for head-mounted displays, detachable head-mounted-display cushions, and methods for assembling facial-interface systems. In some embodiments, a detachable head-mounted-display cushion may include a cushion layer having a user-side surface dimensioned to abut a facial portion of a user and a display-side surface dimensioned to abut a mounting surface of a facial-interface system for a head-mounted display. The detachable head-mounted-display cushion may also include a magnetic-coupling mechanism configured to removably attach the cushion layer to the mounting surface of the facial-interface system.

In some examples, the cushion layer may define a display-side recess extending into the cushion layer from the display-side surface toward the user-side surface. In addition, the display-side recess may be dimensioned to receive a corresponding mounting protrusion protruding from the mounting surface of the facial-interface system. In one example, the cushion layer may also define a user-side recess extending into the cushion layer from the user-side surface toward the display-side recess. In this example, the user-side recess may be separated from the display-side recess by an inner section of the cushion layer.

In some examples, the user-side recess may overlap the display-side recess in a direction extending between the user-side surface and the display-side surface. In addition, the inner section of the cushion layer may include (a) a display-side-recess end surface defining an end portion of the display-side recess closest to the user-side recess and (b) a user-side-recess end surface defining an end portion of the user-side recess located closest to the display-side recess. In this example, the display-side-recess end surface may be substantially parallel to the user-side-recess end surface.

In some examples, the magnetic-coupling mechanism may include at least one magnetic coupling element. In addition, this magnetic coupling element may be disposed within at least one user-side recess extending into the cushion layer from the user-side surface. In one example, the cushion layer may be formed from a foam material.

In some examples, the cushion layer may define a plurality of display-side recesses and a plurality of user-side recesses. In these examples, each of the plurality of display-side recesses may extend into the cushion layer from the display-side surface. In addition, each of the plurality of user-side recesses may overlap an adjacent display-side recess and extend into the cushion layer from the user-side surface toward the adjacent display-side recess.

A corresponding head-mounted-display system may include a head-mounted display, a facial-interface mounting member for the head-mounted display, and a cushion layer abutting the facial-interface mounting member. The head-mounted-display system may also include a magnetic-coupling mechanism removably attaching the cushion layer to the facial-interface mounting member.

In one example, the cushion layer may include a display-side surface abutting a mounting surface of the facial-interface mounting member. In this example, the cushion layer may define a display-side recess extending into the cushion layer from the display-side surface. In addition, the facial-interface mounting member may include a mounting protrusion disposed within the display-side recess.

In some embodiments, the cushion layer may also include a user-side surface configured to abut a facial portion of a user. In these embodiments, the cushion layer may define a user-side recess extending into the cushion layer from the user-side surface. In addition, the magnetic-coupling mechanism may include a magnetic coupling element disposed within the user-side recess.

In some examples, the facial-interface mounting member may include at least one mounting-member magnetic element and the magnetic-coupling mechanism may include at least one magnetic coupling element. In these examples, the cushion layer may be removably attached to the facial-interface mounting member by a magnetic field between the magnetic coupling element and the mounting-member magnetic element. In addition, at least a portion of the cushion layer may be disposed between the mounting-member magnetic element and the magnetic coupling element.

In one embodiment, a method may include (a) positioning a cushion layer abutting a facial-interface mounting member for a head-mounted display and (b) removably attaching the cushion layer to the facial-interface mounting member with a magnetic-coupling mechanism.

In one example, positioning the cushion layer abutting the facial-interface mounting member may include positioning a mounting protrusion of the facial-interface mounting member within a display-side recess defined within the cushion layer. In this example, the display-side recess may extend into the cushion layer from a display-side surface of the cushion layer facing the facial-interface mounting member.

In some embodiments, removably attaching the cushion layer to the facial-interface mounting member with a magnetic-coupling mechanism may include positioning the cushion layer between at least one magnetic coupling element of the magnetic-coupling mechanism and at least one mounting-member magnetic element of the facial-interface mounting member. In addition, positioning the cushion layer abutting the facial-interface mounting member may include conforming the cushion layer to a mounting surface of the facial-interface mounting member.

Various advantages of the present application will be apparent in light of the descriptions below.

BRIEF DESCRIPTION OF THE DRAWINGS

For a better understanding of the various described embodiments, reference should be made to the Detailed Description below, in conjunction with the following draw

DETAILED DESCRIPTION OF EXEMPLARY EMBODIMENTS

The present disclosure describes various facial-interface systems for head-mounted displays, detachable head-mounted-display cushions, and methods for assembling facial-interface systems. As will be explained in greater detail below, embodiments of the instant disclosure may include a detachable facial-interface cushion (i.e., a detachable head-mounted-display cushion) for a head-mounted display that may be removably attached to a mounting surface of a facial-interface system for a head-mounted display by a magnetic-coupling mechanism. In some embodiments, the facial-interface cushion may include one or more recesses that facilitate alignment and attachment of the facial-interface cushion to the mounting surface directly and/or utilizing magnets of the magnetic-coupling mechanism. The facial-interface cushion may thus be readily removed and replaced by a user, allowing the user to change the facial-interface cushion when it becomes worn or dirty. The facial-interface system may also enable a user to mount an appropriately sized and shaped facial-interface cushion to the mounting surface. For example, the user may select a facial-interface cushion that fits the user's particular face size and shape and/or that enables the user to wear accessories, such as glasses, while wearing the head-mounted display. Because such a facial-interface cushion may be easily removed and attached to the mounting surface, the user may conveniently try on multiple sizes and shapes of facial-interface cushions to determine an appropriate fit.

Reference will now be made to various exemplary embodiments, examples of which are illustrated in the accompanying drawings. In the following description, numerous specific details are set forth in order to provide an understanding of the various described embodiments. However, it will be apparent to one of ordinary skill in the art that the various described embodiments may be practiced without these specific details. In other instances, well-known systems, methods, procedures, components, circuits, and networks have not been described in detail so as not to unnecessarily obscure aspects of the embodiments.

The following will provide, with reference to FIGS. 1-10, detailed descriptions of exemplary facial-interface systems and facial-interface cushions for head-mounted displays. Detailed descriptions of corresponding methods for assembling facial-interface systems will also be provided in connection with FIG. 11.

Figure 1:
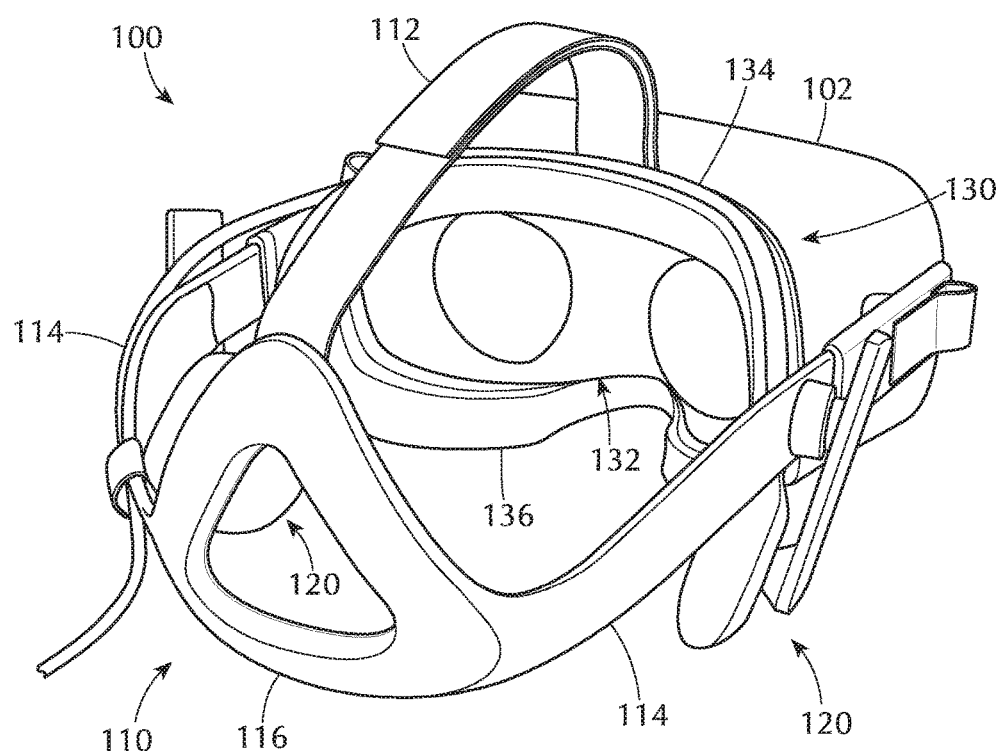
- FIG. 1 is a perspective view of an exemplary head-mounted-display system in accordance with some embodiments.

FIG. 1 is a perspective view of a head-mounted-display system 100 in accordance with some embodiments. In some embodiments, head-mounted-display system 100 includes a head-mounted display 102, a strap system 110, an audio subsystem 120, and a facial-interface system 130. The term "head-mounted display," as used herein, generally refers to any type or form of display device or system that is worn on or about a user's head and displays visual content to a user. Head-mounted displays may display content in any suitable manner, including via a screen (e.g., an LCD or LED screen), a projector, a cathode ray tube, an optical mixer, etc. Head-mounted displays may display content in one or more of various media formats. For example, a head-mounted display may display video, photos, and/or computer-generated imagery (CGI).

Head-mounted displays may provide diverse and distinctive user experiences. Some head-mounted displays may provide virtual-reality experiences (i.e., they may display computer-generated or pre-recorded content), while other head-mounted displays may provide real-world experiences (i.e., they may display live imagery from the physical world). Head-mounted displays may also provide any mixture of live and virtual content. For example, virtual content may be projected onto the physical world (e.g., via optical or video see-through), which may result in augmented reality or mixed reality experiences.

Head-mounted displays may be configured to be mounted to a user's head in a number of ways. Some head-mounted displays may be incorporated into glasses or visors. Other head-mounted displays may be incorporated into helmets, hats, or other headwear. Examples of head-mounted displays may include OCULUS RIFT, GOOGLE GLASS, VIVE, SAMSUNG GEAR, etc.

In some embodiments, strap system 110 may be used for adjustably mounting head-mounted display 102 on the user's head. As shown in FIG. 1, strap system 110 may include an upper strap 112 and lower straps 114 that are coupled to head-mounted display 102 to adjustably conform to the top and/or sides of the user's head when the user is wearing the head-mounted display. In some embodiments, strap system 110 may include a back piece 116 coupled with upper strap 112 and lower straps 114 to rest against the back of the user's head (e.g., around the user's occipital lobe).

In some embodiments, audio subsystem 120 may be integrated with head-mounted display 102 and may provide audio signals to the user's ears. Head-mounted-display system 100 may, for example, have two audio subsystems located on the left and right sides of head-mounted-display system 100 to provide audio signals to the user's left and right ears.

In some embodiments, facial-interface system 130 may be configured to comfortably rest against a region of the user's face, including a region surrounding the user's eyes, when head-mounted-display system 100 is worn by the user. In these embodiments, facial-interface system 130 may include a facial-interface cushion 136 that is coupled to a facial-interface mounting member 134. Facial-interface cushion 136 and facial-interface mounting member 134 may surround a viewing region 132 that includes the user's field of vision while the user is wearing head-mounted-display system 100. Facial-interface mounting member 134 may be coupled to head-mounted display 102 and/or may be integrally formed with at least a portion of head-mounted display 102. In some embodiments, facial-interface mounting member 134 may be removably coupled to head-mounted display 102 to allow for removal and attachment by a user. In at least one embodiment, facial-interface mounting member 134 may be secured to and/or integrally formed with a portion of head-mounted display 102 such that facial-interface mounting member 134 is not removable by a user.

Figure 2:
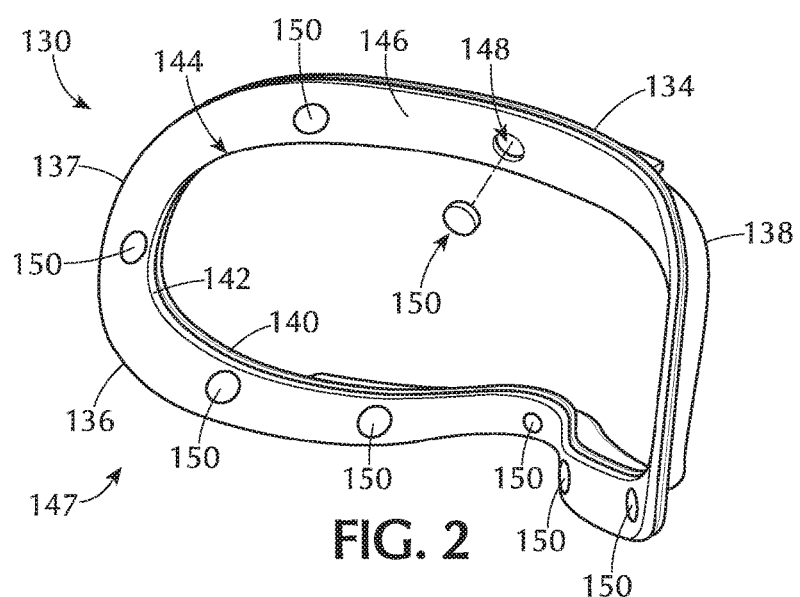
FIG. 2 is a perspective view of an exemplary facial-interface system for a head-mounted display in accordance with some embodiments.

FIG. 2 is a perspective view of facial-interface system 130 for head-mounted-display system 100 in accordance with some embodiments. As shown in FIG. 2, facial-interface system 130 may include facial-interface cushion 136 secured to facial-interface mounting member 134 by a magnetic-coupling mechanism 147. In one example, and as will be described in greater detail below in reference to FIGS. 5 and 6, facial-interface cushion 136 may include a cushion layer 137 that is coupled to facial-interface mounting member 134 by a magnetic force between at least one magnetic coupling element 150 of magnetic-coupling mechanism 147 and at least one corresponding magnet and/or ferromagnetic material of facial-interface mounting member 134 such that cushion layer 137 is securely held between magnetic coupling element 150 and facial-interface mounting member 134. In some embodiments, cushion layer 137 and/or facial-interface mounting member 134 may include one or more mechanical features to further secure facial-interface cushion 136 to facial-interface mounting member 134 and/or to position facial-interface cushion 136 on facial-interface mounting member 13. For example, cushion layer 137 and/or facial-interface mounting member 134 may include one or more protrusions, recesses, and/or fasteners (e.g., hook and loop fasteners, snap fasteners, threaded fasteners, flanges, etc., without limitation) for removably securing cushion layer 137 to facial-interface mounting member 134.

In some embodiments, cushion layer 137 may include or be formed from a pliable material. For example, cushion layer 137 may include or be formed from a foam material (e.g., polyurethane foam) and/or any other pliable material suitable for contacting a facial region of a user and/or suitable for conforming to a shape of facial-interface mounting member 134. In some examples, the pliable material may enable cushion layer 137 to conform to a mounting surface (e.g., mounting surface 156 illustrated in FIG. 3) of facial-interface mounting member 134. The pliable material may also enable facial-interface cushion 136 to be flattened or otherwise conformed to a desired shape. For example, facial-interface cushion 136 may be arranged in a generally flattened configuration to facilitate efficient packaging and/or shipping of facial-interface cushion 136.

In some embodiments, facial-interface mounting member 134 may include a head-mounted display connection portion 138 that is configured to couple facial-interface system 130 to head-mounted display 102. For example, head-mounted display connection portion 138 may include at least one protruding portion that is inserted into and secured within a corresponding receiving portion of head-mounted display 102.

In some embodiments, facial-interface mounting member 134 may include a mounting-member inner surface 140 that surrounds a viewing opening 144, which corresponds to, for example, viewing region 132 illustrated in FIG. 1. In some embodiments, cushion layer 137 may include a facial-interface inner surface 142 that is generally aligned with mounting-member inner surface 140 and that surrounds viewing opening 144. Viewing opening 144 may be configured to surround portions of a user's face, such as the eye and orbital facial regions, and a viewing region in front of portions of the user's face when head-mounted-display system 100 is worn by the user. For example, opening 144 may be sized and shaped so as to not obstruct the user's field of vision, enabling the user to view images displayed by head-mounted display 102 without visual interference. Additionally, opening 144 may be sized and shaped to surround other articles, such as glasses, that are worn by the user.

In some embodiments, cushion layer 137 may include a user-side surface 146 that is configured to abut a facial portion of the user when head-mounted-display system 100 is worn by the user. For example, user-side surface 146 of cushion layer 137 may be configured to abut at least a portion of the user's nose, cheek, and/or forehead facial regions.

In some embodiments, magnetic-coupling mechanism 147 may be configured to removably attach cushion layer 137 to facial-interface mounting member 134. Magnetic-coupling mechanism 147 may, for example, include at least one magnetic portion that is configured to magnetically couple with at least one corresponding portion of facial-interface mounting member 134, thereby attaching cushion layer 137 to mounting member 134. In some embodiments, magnetic-coupling mechanism 147 may be coupled to, integrated with, and/or disposed abutting at least a portion of cushion layer 137, without limitation. In some embodiments, magnetic-coupling mechanism 147 may include at least one permanent magnet and/or at least one ferromagnetic material (e.g., a ferromagnetic metal).

In some embodiments, magnetic-coupling mechanism 147 may include at least one recess defined within at least a portion of cushion layer 137. For example, magnetic-coupling mechanism 147 may include at least one magnetic coupling element 150 disposed adjacent to and/or within at least a portion of cushion layer 137, such as a recess defined within cushion layer 137. Magnetic coupling elements 150 may each include at least one magnetic and/or ferromagnetic material, without limitation. For example, magnetic coupling elements 150 may be permanent magnets including one or more magnetic materials. In one example, magnetic coupling elements 150 may include one or more ferromagnetic materials, such as a metal, that is magnetically attracted to a permanent magnet. In some embodiments, cushion layer 137 may define at least one user-side recess 148 corresponding to magnetic coupling element 150. For example, as illustrated in FIG. 2, cushion layer 137 may define at least one user-side recess 148 extending into cushion layer 137 from user-side surface 146 toward facial-interface mounting member 134. In one example, each magnetic coupling element 150 may be disposed within a corresponding user-side recess 148. In at least one embodiment, each user-side recess 148 may have a shape that conforms to an outer periphery of a corresponding magnetic coupling element 150 so as to hold the magnetic coupling element 150 within user-side recess 148 to a desired degree. For example, each magnetic coupling element 150 may be securely or loosely held within a corresponding user-side recess 148. In some embodiments, user-side recess 148 and/or magnetic coupling element 150 may have a substantially cylindrical and/or rounded disk shape. User-side recess 148 and/or magnetic coupling element 150 may have any other suitable shape, without limitation. In some embodiments, magnetic-coupling mechanism 147 may include a magnet that is disposed on a side of cushion layer 137 adjacent to facial-interface mounting member 134 and/or that is not separated from a surface of facial-interface mounting member 134 by at least a portion of cushion layer 137. In some embodiments, magnetic-coupling mechanism 147 may include a magnetic layer disposed on and/or within at least a portion of cushion layer 137.

In some embodiments, a plurality of user-side recesses 148 may be defined within cushion layer 137, and a corresponding magnetic coupling element 150 may be disposed within each of the plurality of user-side recesses 148 so as to secure cushion layer 137 to facial-interface mounting member 134 at a plurality of locations. User-side recesses 148 and magnetic coupling elements 150 may each have any suitable size and/or shape. In some embodiments, each of the plurality of user-side recesses 148 may be substantially the same size and/or shape. In some embodiments, user-side recesses 148 defined at various locations in cushion layer 137 may have two or more different sizes and/or shapes. Corresponding magnetic coupling elements 150 may also have two or more different sizes and/or shapes. For example, a user-side recess 148 and a corresponding magnetic coupling element 150 located at a portion of cushion layer 137 configured to abut a nasal region of a user's face may have a smaller width in a direction substantially parallel to user-side surface 146 than a user-side recess 148 and a corresponding magnetic coupling element 150 located at a portion of cushion layer 137 configured to abut a forehead region of the user's face.

Figure 3:
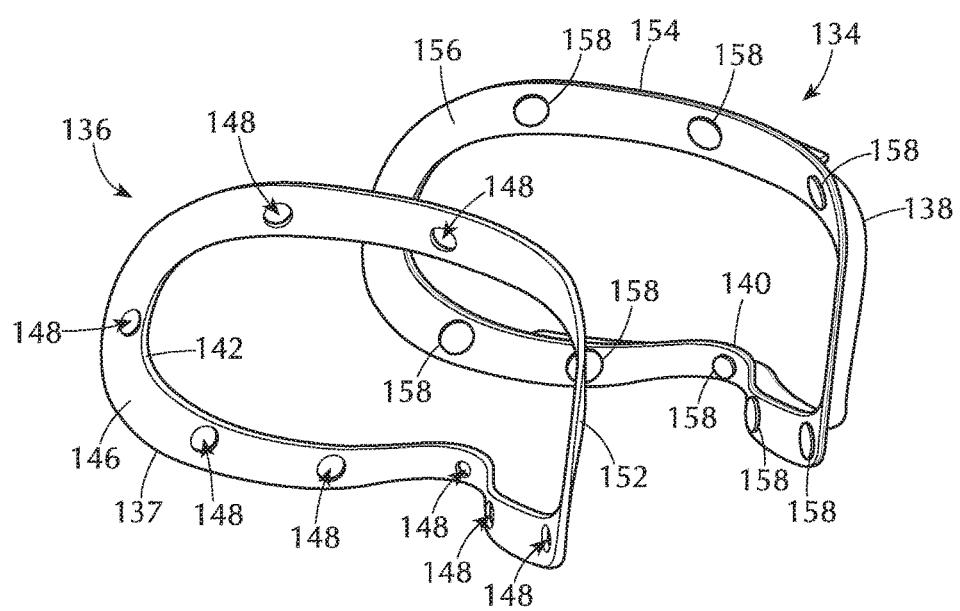
FIG. 3 is a perspective view of an exemplary facial-interface cushion and facial-interface mounting member for a head-mounted display in accordance with some embodiments.

FIG. 3 is a perspective view of facial-interface cushion 136 and facial-interface mounting member 134 for head-mounted-display system 100 showing facial-interface cushion 136 separated from facial-interface mounting member 134 in accordance with some embodiments. As shown in FIG. 3, a plurality of user-side recesses 148 may be defined in cushion layer 137 and cushion layer 137 may include a display-side surface 152 that is configured to abut a mounting surface 156 of facial-interface mounting member 134. In some embodiments, display-side surface 152 may be substantially parallel to user-side surface 146 and/or may face in a direction that is substantially opposite to user-side surface 146.

In some embodiments, facial-interface mounting member 134 may include a mounting-member body 154 having at least one mounting protrusion 158 protruding away from mounting surface 156. For example, as illustrated in FIG. 3, facial-interface mounting member 134 may include a plurality of mounting protrusions 158 protruding away from mounting surface 156 and toward facial-interface cushion 136. In some embodiments, as will be described below in reference to FIGS. 4-6, mounting member protrusions 158 may each be configured to fit within a corresponding display-side recess defined within cushion layer 137. In some embodiments, facial-interface mounting member 134 may include at least one magnetic portion. For example, facial-interface mounting member 134 may include one or more magnets corresponding to and/or configured to be disposed adjacent to one or more magnetic coupling elements 150. In some embodiments, facial-interface mounting member 134 may include at least one magnetic member and/or layer disposed within and/or on at least a portion of facial-interface mounting member 134. In some embodiments, facial-interface mounting member 134 may include at least one permanent magnet and/or at least one ferromagnetic material (e.g., a ferromagnetic metal).

Figure 4:
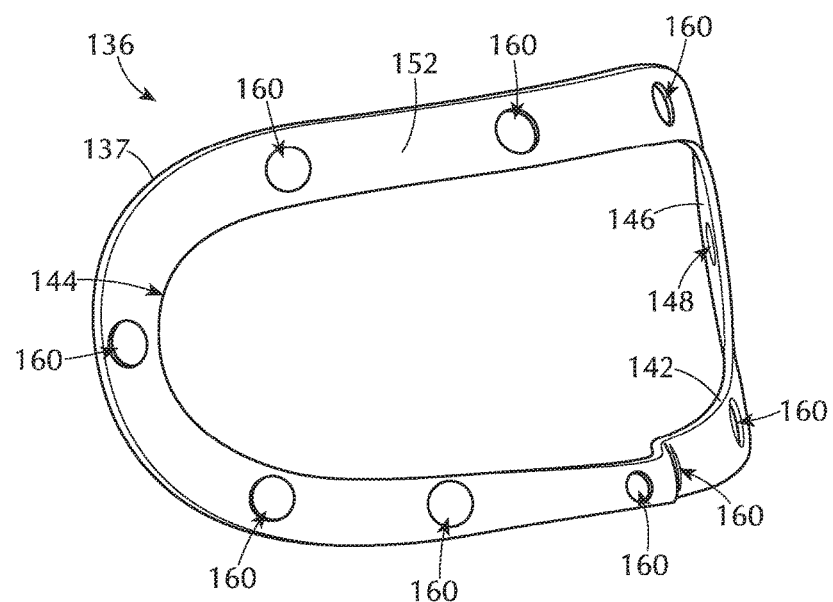
FIG. 4 is a perspective view of an exemplary facial-interface cushion for a head-mounted display in accordance with some embodiments.

FIG. 4 is a perspective view of facial-interface cushion 136 showing a side of facial-interface cushion 136 configured to abut facial-interface mounting member 134. As shown in FIG. 4, cushion layer 137 of facial-interface cushion 136 may include display-side surface 152, which may be configured to abut mounting surface 156 of facial-interface mounting member 134. Cushion layer 137 may define at least one display-side recess 160 extending into cushion layer 137 from display-side surface 152 toward a corresponding user-side recess 148. For example, cushion layer 137 may define a plurality of display-side recesses 160 disposed at separate locations in cushion layer 137.

In some embodiments, each of the plurality of display-side recesses 160 may correspond to one of the plurality of user-side recesses 148 illustrated in FIGS. 2 and 3. In some embodiments, each of the plurality of display-side recesses 160 may overlap an adjacent one of the plurality of user-side recesses 148 in a direction extending between user-side surface 146 and display-side surface 152. In some embodiments, at least one of the display-side recesses 160 may have a greater width in a direction parallel to display-side surface 152 and/or user-side surface 146 of cushion layer 137 than a corresponding adjacent user-side recess 148. In some embodiments, one or more of the plurality of display-side recesses 160 may be located in a position that does not overlap a user-side recess 148, as will be described in greater detail below in reference to FIG. 7.

In some embodiments, each display-side recess 160 of cushion layer 137 may have a shape configured to surround a corresponding mounting protrusions 158 of facial-interface mounting member 134. For example, at least one display-side recess 160 may have a substantially cylindrical and/or rounded shape configured to surround a corresponding cylindrical and/or rounded mounting protrusion 158. Display-side recesses 160 and mounting protrusions 158 may have any other suitable shape, without limitation.

Display-side recesses 160 defined within cushion layer 137 and mounting protrusions 158 of facial-interface mounting member 134 may each have any suitable size and/or shape. For example, display-side recesses 160 defined at various locations within cushion layer 137 may have two or more different sizes and/or shapes. Corresponding mounting protrusions 158 may also have two or more different sizes and/or shapes. For example, a display-side recess 160 and a corresponding mounting protrusion 158 located at or near a portion of cushion layer 137 configured to abut a nasal region of a user's face may have a smaller width in a direction substantially parallel to display-side surface 152 than a display-side recess 160 and a corresponding mounting protrusion 158 located at or near a portion of cushion layer 137 configured to abut a forehead region of the user's face.

In some embodiments, each mounting protrusion 158 may be secured within a corresponding display-side recess 160 to a desired degree. For example, a mounting protrusion 158 and a corresponding display-side recess 160 may each be sized and shaped to mechanically secure cushion layer 137 to facial-interface mounting member 134. A portion of cushion layer 137 defining a display-side recess 160 may, for example, tightly surround the corresponding mounting protrusion 158 such that cushion layer 137 is secured (e.g., by frictional and/or compressive force) to facial-interface mounting member 134 at mounting protrusion 158. Mounting protrusions 158 of facial-interface mounting member 134 and display-side recesses 160 of cushion layer 137 may also facilitate positioning and/or alignment of facial-interface cushion 136 with respect to facial-interface mounting member 134.

In some embodiments, facial-interface cushion 136 may be secured to facial-interface mounting member 134 without magnetic coupling elements 150 or with a number of magnetic coupling elements 150 that is fewer than the number of display-side recesses 160. For example, a plurality of mounting protrusions 158 of facial-interface mounting member 134 may be mechanically secured within a plurality of display-side recesses 160 of cushion layer 137, thereby securing facial-interface cushion 136 to facial-interface mounting member 134 with no magnetic coupling elements 150 or with a number of magnetic coupling elements 150 that is fewer than the total number of display-side recesses 160 and/or fewer than the total number of mounting protrusions 158. Cushion layer 137 may, in such an embodiment, include no user-side recesses 148 or a number of user-side recesses 148 that is fewer than the total number of display-side recesses 160 and/or fewer than the total number of mounting protrusions 158.

Figure 5:
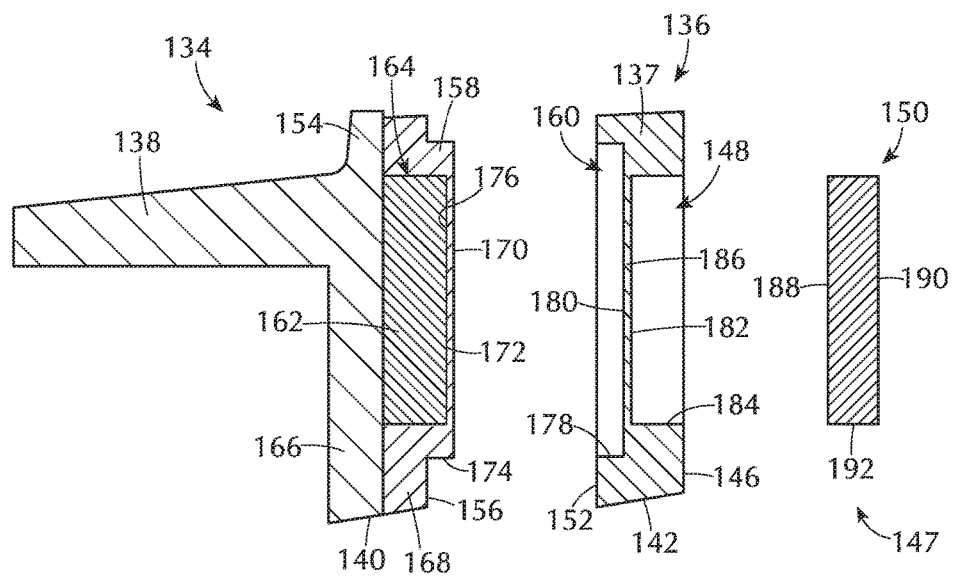
FIG. 5 is a cross-sectional view of portions of an exemplary facial-interface mounting member, facial-interface cushion, and magnetic coupling element for a head-mounted display in accordance with some embodiments.
Figure 6:
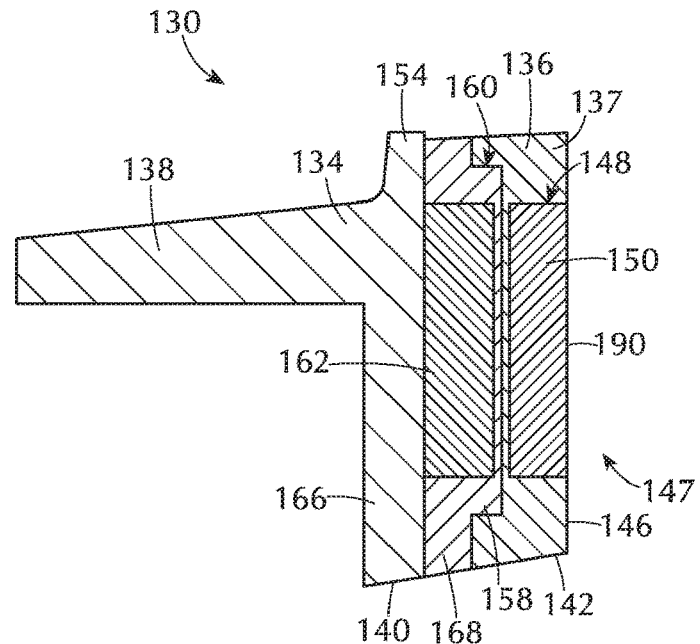
FIG. 6 is a cross-sectional view of a portion of an exemplary facial-interface system for a head-mounted display in accordance with some embodiments.

FIG. 5 is a cross-sectional view of portions of an exemplary facial-interface mounting member 134, facial-interface cushion 136, and magnetic coupling element 150 for an exemplary facial-interface system 130 and FIG. 6 is a cross-sectional view of a portion of exemplary facial-interface system 130 including the facial-interface cushion 136 and magnetic coupling element 150 illustrated in FIG. 5. FIGS. 5 and 6 illustrate cross-sections extending through a user-side recess 148 and a display-side recess 160 of facial-interface system 130 in a direction substantially perpendicular to user-side surface 146 and/or display-side surface 152 of cushion layer 137.

In some embodiments, facial-interface mounting member 134 may include one or more mounting-member magnetic elements 162. For example, as shown in FIGS. 5 and 6, mounting-member magnetic element 162 may be attached to mounting-member body 154. In some embodiments, mounting-member magnetic element 162 may be disposed within a mounting-member-element recess 164 defined within a magnetic-element holding member 168 of mounting-member body 154. Magnetic-element holding member 168, which includes mounting surface 156 and mounting protrusion 158 of mounting-member body 154, may be coupled to a support member 166 of mounting-member body 154 such that mounting-member magnetic element 162 is disposed between magnetic-element holding member 168 and support member 166.

In some embodiments, at least a portion of mounting-member magnetic element 162 may be disposed within at least a portion of mounting protrusion 158 of facial-interface mounting member 134. For example, as shown in FIGS. 5 and 6, mounting-member magnetic element 162 may be disposed within mounting-member-element recess 164, which may be defined within at least a portion of mounting protrusion 158. Mounting-member magnetic element 162 may include at least one magnetic and/or ferromagnetic material, without limitation. For example, mounting-member magnetic element 162 may be a permanent magnet including one or more magnetic materials. In one example, mounting-member magnetic element 162 may include one or more ferromagnetic materials, such as a metal, that is magnetically attracted to a permanent magnet.

In some embodiments, mounting protrusion 158 may include a protrusion end surface 170 disposed away from mounting surface 156 and a protrusion peripheral surface 174 extending between protrusion end surface 170 and mounting surface 156. Mounting-member magnetic element 162 may include a mounting-member-element end surface 172 disposed adjacent to and/or abutting an element-recess end surface 176 defining an end of mounting-member-element recess 164 and located adjacent to protrusion end surface 170 of mounting protrusion 158 such that mounting-member-element end surface 172 is positioned adjacent to protrusion end surface 170. In some embodiments, mounting-member-element end surface 172 may be substantially parallel to protrusion end surface 170.

In some embodiments, mounting protrusion 158 may be disposed within display-side recess 160 defined within facial-interface cushion 136. Display-side recess 160 may be defined within cushion layer 137 by a display-side-recess end surface 180, which may be located away from display-side surface 152, and a display-side-recess inner surface 178 extending between display-side-recess end surface 180 and display-side surface 152 of cushion layer 137. Display-side-recess inner surface 178 of cushion layer 137 may be configured to surround protrusion peripheral surface 174 of mounting protrusion 158. In some embodiments, at least a portion of mounting-member magnetic element 162 may also be disposed within display-side recess 160 and mounting-member magnetic element 162 may be separated from cushion layer 137 by mounting protrusion 158, which may surround at least a portion of mounting-member magnetic element 162. When mounting protrusion 158 is disposed within display-side recess 160, protrusion end surface 170 of mounting protrusion 158 may be positioned adjacent to and/or abutting display-side-recess end surface 180 of cushion layer 137, and mounting surface 156 of mounting-member body 154 may be positioned adjacent to and/or abutting display-side surface 152 of cushion layer 137.

In some embodiments, mounting protrusion 158 of facial-interface mounting member 134 and display-side recess 160 of facial-interface cushion 136 may facilitate positioning and mounting of facial-interface cushion 136 to facial-interface mounting member 134. For example, mounting protrusion 158 may guide facial-interface cushion 136 into a specified position with respect to facial-interface mounting member 134 as mounting protrusion 158 is inserted into display-side recess 160. In some embodiments, display-side-recess inner surface 178 of cushion layer 137 may have a diameter in a direction substantially parallel to display-side surface 152 that is approximately the same as or larger than a diameter of protrusion peripheral surface 174 in a direction substantially parallel to mounting surface 156 of mounting-member body 154.

In some embodiments, facial-interface cushion 136 may be secured to facial-interface mounting member 134 by a mechanical coupling between at least a portion of cushion layer 137 defining display-side recess 160 and at least a portion of mounting protrusion 158. For example, display-side-recess inner surface 178 of cushion layer 137 may closely conform to protrusion peripheral surface 174 of mounting protrusion 158 such that display-side-recess inner surface 178 is mechanically engaged (e.g., by a frictional and/or compressive force) with protrusion peripheral surface 174. In some embodiments, display-side-recess inner surface 178 of cushion layer 137 may have a diameter in a direction substantially parallel to display-side surface 152 that is approximately the same as or smaller than a diameter of protrusion peripheral surface 174 in a direction substantially parallel to mounting surface 156 of mounting-member body 154 such that display-side-recess inner surface 178 exerts a compressive force toward protrusion peripheral surface 174 when mounting protrusion 158 is disposed within display-side recess 160. Mounting protrusion 158 and/or a portion of cushion layer 137 defining display-side recess 160 may also include one or more mechanical features to securely couple facial-interface cushion 136 to facial-interface mounting member 134, without limitation.

In some embodiments, magnetic coupling element 150 may be disposed within user-side recess 148 defined within facial-interface cushion 136. User-side recess 148 may be defined within cushion layer 137 by a user-side-recess end surface 182, which may be located away from user-side surface 146, and a user-side-recess inner surface 184 extending between user-side-recess end surface 182 and user-side surface 146 of cushion layer 137. User-side-recess inner surface 184 of cushion layer 137 may be configured to surround magnetic coupling element 150. When magnetic coupling element 150 is disposed within user-side recess 148, a display-side end surface 188 of magnetic coupling element 150 may be positioned adjacent to and/or abutting user-side-recess end surface 182 of cushion layer 137, and a coupling-element peripheral surface 192 of magnetic coupling element 150 may be positioned adjacent to and/or abutting user-side-recess inner surface 184 of cushion layer 137. In some embodiments, user-side-recess inner surface 184 of cushion layer 137 may closely conform to coupling-element peripheral surface 192 of magnetic coupling element 150 such that user-side-recess inner surface 184 is mechanically engaged (e.g., by a frictional and/or compressive force) with coupling-element peripheral surface 192 of magnetic coupling element 150. In some embodiments, user-side-recess inner surface 184 of cushion layer 137 may not tightly conform to coupling-element peripheral surface 192 of magnetic coupling element 150 such that magnetic coupling element 150 has some degree of movement within user-side recess 148, thereby facilitating insertion, removal, and/or adjustment of magnetic coupling element 150 within user-side recess 148.

In some embodiments, when magnetic coupling element 150 is disposed within user-side recess 148 defined within facial-interface cushion 136, a user-side end surface 190 of magnetic coupling element 150 may be configured to face toward a user wearing head-mounted-display system 100. User-side end surface 190 of magnetic coupling element 150 may be substantially flush with user-side surface 146 of cushion layer 137. In some embodiments, user-side end surface 190 of magnetic coupling element 150 may be disposed within user-side recess 148 of cushion layer 137 such that user-side end surface 190 is not flush with user-side surface 146 of cushion layer 137. In some embodiments, a layer may be positioned over user-side end surface 190 of magnetic coupling element 150 and/or user-side recess 148 of cushion layer 137 to separate magnetic coupling element 150 from a facial region of a user and/or to provide a more uniform surface for contacting the facial region of the user.

In some embodiments, cushion layer 137 may include a cushion inner section 186 located between user-side recess 148 and display-side recess 160. Cushion inner section 186 may partially or fully separate user-side recess 148 from display-side recess 160. Cushion inner section 186 may include display-side-recess end surface 180, which defines an end portion of display-side recess 160, and user-side-recess end surface 182, which defines an end portion of user-side recess 148. In some embodiments, display-side-recess end surface 180 may be substantially parallel to user-side-recess end surface 182. Cushion inner section 186 may be held between magnetic coupling element 150 and mounting protrusion 158 of facial-interface mounting member 134 when magnetic coupling element 150 is engaged with mounting-member magnetic element 162 by a magnetic force between magnetic coupling element 150 and mounting-member magnetic element 162, thereby securing at least a portion of facial-interface cushion 136 to facial-interface mounting member 134.

In some embodiments, as shown in FIGS. 5 and 6, display-side recess 160 defined in cushion layer 137 may have a width in a direction substantially parallel to display-side surface 152 and/or user-side surface 146 of cushion layer 137 that is greater than a width of user-side recess 148 in the direction substantially parallel to display-side surface 152 and/or user-side surface 146. Display-side recess 160 and user-side surface 146 may have any other suitable widths, without limitation.

Figure 7:
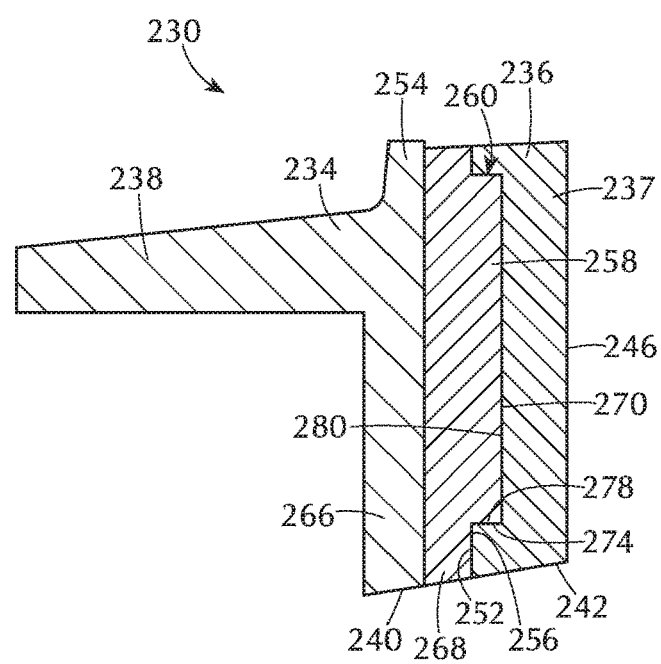
FIG. 7 is a cross-sectional view of a portion of an exemplary facial-interface system for a head-mounted display in accordance with some embodiments.

FIG. 7 is a cross-sectional view of a portion of an exemplary facial-interface system 230. In some embodiments, as shown in FIG. 7, facial-interface system 230 may include at least a portion of a facial-interface cushion 236 that is coupled and secured to at least a portion of a facial-interface mounting member 234 without a magnetic force.

In some embodiments, facial-interface mounting member 234 may include a head-mounted display connection portion 238 and a mounting-member body 254 having a support member 266 and a mounting portion 268. Facial-interface mounting member 234 may also include a mounting-member inner surface 240. Mounting portion 268 may include a mounting surface 256 and a mounting protrusion 258 extending away from mounting surface 256. Mounting protrusion 258 may include a protrusion end surface 270 and a protrusion peripheral surface 274 extending between mounting surface 256 and protrusion end surface 270.

In some embodiments, facial-interface cushion 236 may include a cushion layer 237 having a display-side surface 252, a user-side surface 246, and a facial-interface inner surface 242. Cushion layer 237 may include a display-side-recess end surface 280 and a display-side-recess inner surface 278 defining a display-side recess 260 within cushion layer 237.

In some embodiments, as shown in FIG. 7, mounting protrusion 258 of facial-interface mounting member 234 may be disposed within display-side recess 260 defined within facial-interface cushion 236. In some embodiments, facial-interface cushion 236 may be secured to facial-interface mounting member 234 by a mechanical coupling between at least a portion of cushion layer 237 defining display-side recess 260 and at least a portion of mounting protrusion 258. For example, display-side-recess inner surface 278 of cushion layer 237 may closely conform to protrusion peripheral surface 274 of mounting protrusion 258 such that display-side-recess inner surface 278 may be mechanically engaged (e.g., by a frictional and/or compressive force) with protrusion peripheral surface 274. In some embodiments, display-side-recess inner surface 278 of cushion layer 237 may have a diameter in a direction substantially parallel to display-side surface 252 that is approximately the same as or smaller than a diameter of protrusion peripheral surface 274 in a direction substantially parallel to mounting surface 256 of mounting-member body 254 such that display-side-recess inner surface 278 exerts a force toward protrusion peripheral surface 274 when mounting protrusion 258 is disposed within display-side recess 260. Mounting protrusion 258 and/or a portion of cushion layer 237 defining display-side recess 260 may also include one or more mechanical features to securely couple facial-interface cushion 236 to facial-interface mounting member 234, without limitation.

Figure 8:
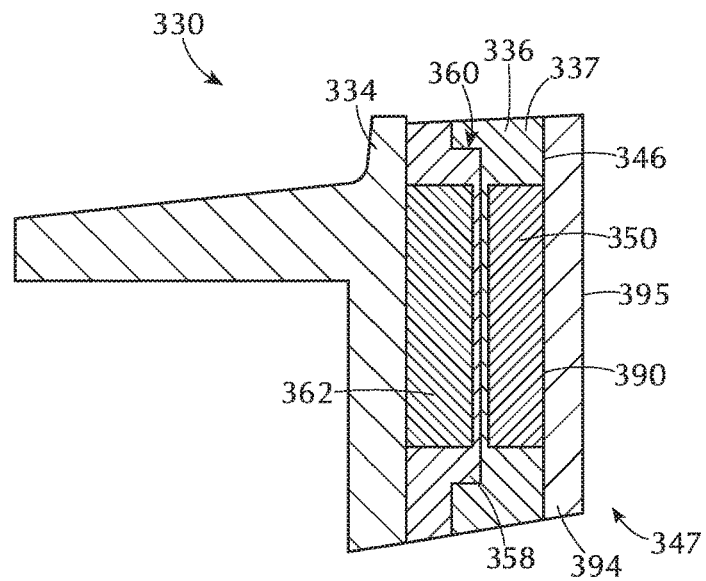
FIG. 8 is a cross-sectional view of a portion of an exemplary facial-interface system for a head-mounted display in accordance with some embodiments.

FIG. 8 is a cross-sectional view of a portion of an exemplary facial-interface system 330. In some embodiments, as shown in FIG. 8, facial-interface system 330 may include at least a portion of a facial-interface cushion 336 that is coupled and secured to at least a portion of a facial-interface mounting member 334 by magnetic-coupling mechanism 347.

In some embodiments, facial-interface cushion 336 may include a cushion layer 337 defining a display-side recess 360 surrounding at least a portion of a mounting protrusion 358 of facial-interface mounting member 334. In some examples, at least a portion of facial-interface cushion 336 may be secured to facial-interface mounting member 334 by a magnetic force between a magnetic coupling element 350 and a mounting-member magnetic element 362 and/or by a mechanical coupling between at least a portion of cushion layer 337 defining display-side recess 360 and at least a portion of mounting protrusion 358, as described in greater detail above.

In at least one embodiment, facial-interface cushion 336 may also include a cover layer 394 covering at least a portion of cushion layer 337 and/or magnetic coupling element 350. For example, as illustrated in FIG. 8, cover layer 394 may be disposed on a user-side surface 346 of cushion layer 337 and on a user-side end surface 390 of magnetic coupling element 350. Cover layer 394 may be coupled to cushion layer 337 and/or magnetic coupling element 350 in any suitable manner (e.g., bonding, fastening, etc.). Cover layer 394 may include a user-side surface 395 positioned to abut a facial portion of a user and may be any suitable size, shape, and thickness. Cover layer 394 may overlap user-side portions of cushion layer 337 and/or magnetic coupling element 350 to provide a comfortable contact surface (i.e., user-side surface 395) for facial regions of the user. Cover layer 394 may also provide an aesthetically appealing exterior on facial-interface cushion 336 by covering one or more magnetic coupling elements 350 and/or surface features (e.g., recesses, etc.) of cushion layer 337. In some embodiments, cover layer 394 may secure one or more magnetic coupling elements 350 within facial-interface cushion 336. Cover layer 394 may include any suitable material (polymer, leather, cloth, woven, etc.) that comfortably contacts and/or cushions back and/or side portions of the user's head. In some examples, cover layer 394 may include a relatively soft polymeric material (e.g., polyurethane foam, etc.) and/or fabric material, such as a polymeric microfiber fabric (e.g., polyester micro-suede, ULTRASUEDE, etc.).

Figure 9:
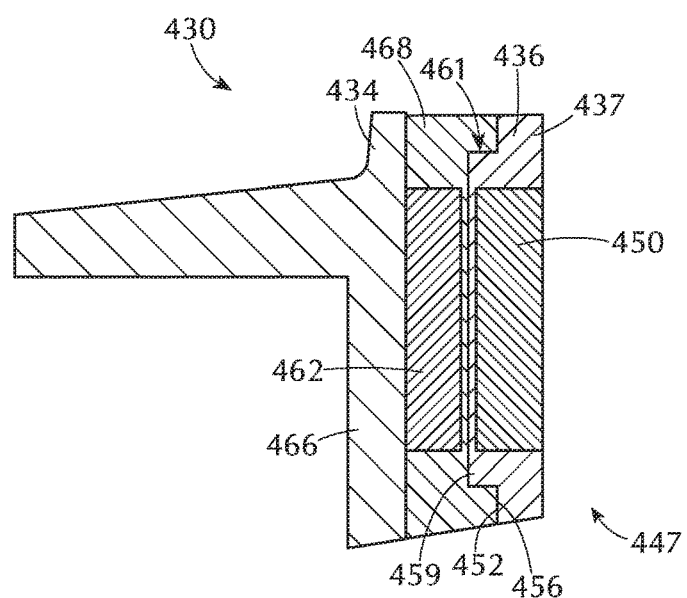
FIG. 9 is a cross-sectional view of a portion of an exemplary facial-interface system for a head-mounted display in accordance with some embodiments.

FIG. 9 is a cross-sectional view of a portion of an exemplary facial-interface system 430. In some embodiments, as shown in FIG. 9, facial-interface system 430 may include at least a portion of a facial-interface cushion 436 that is coupled and secured to at least a portion of a facial-interface mounting member 434 by magnetic-coupling mechanism 447.

In some embodiments, facial-interface cushion 436 may include a cushion layer 437 having a mounting protrusion 459 that is disposed within a mounting recess 461 defined within facial-interface mounting member 434. For example, as shown in FIG. 9, mounting protrusion 459 may extend from a display-side surface 452 of cushion layer 437 and mounting recess 461 may extend into at least a portion of facial-interface mounting member 434. In one example, mounting recess 461 may be defined by a magnetic-element holding member 468 of facial-interface mounting member 434 and mounting recess 461 may extend from a portion of mounting surface 456 of magnetic-element holding member 468 toward a support member 466 of facial-interface mounting member 434.

As illustrated in FIG. 9, when display-side surface 452 of cushion layer 437 is positioned abutting mounting surface 456 of facial-interface mounting member 434, at least a portion of magnetic-element holding member 468 defining mounting recess 461 may surround at least a portion of a mounting protrusion 459 of cushion layer 437. In some embodiments, at least a portion of cushion layer 437 may be secured to facial-interface mounting member 434 by a magnetic force between a magnetic coupling element 450 and a mounting-member magnetic element 462 and/or by a mechanical coupling between at least a portion of mounting protrusion 459 of cushion layer 437 and at least a portion of facial-interface mounting member 434 defining mounting recess 461 (see, e.g., FIGS. 6 and 7). One or more mounting protrusions 459 of cushion layer 437 and corresponding mounting recesses 461 of facial-interface mounting member 434 may also facilitate positioning and/or alignment of facial-interface cushion 436 with respect to facial-interface mounting member 434.

Figure 10:
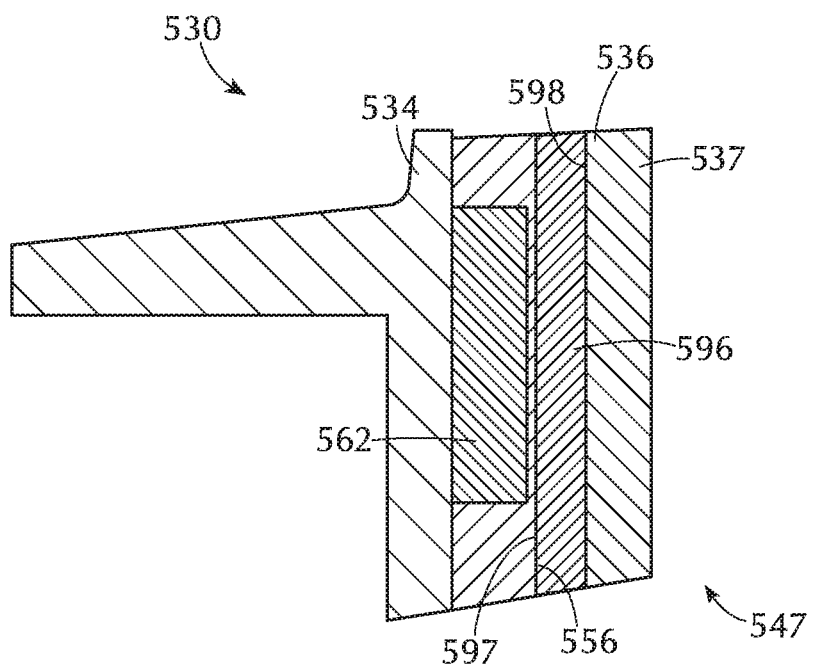
FIG. 10 is a cross-sectional view of a portion of an exemplary facial-interface system for a head-mounted display in accordance with some embodiments.

FIG. 10 is a cross-sectional view of a portion of an exemplary facial-interface system 530. In some embodiments, as shown in FIG. 10, facial-interface system 530 may include at least a portion of a facial-interface cushion 536 that is coupled and secured to at least a portion of a facial-interface mounting member 534 by magnetic-coupling mechanism 547.

In some embodiments, facial-interface cushion 536 and/or facial-interface mounting member 534 may include a magnetic layer as part of magnetic-coupling mechanism 547. For example, as shown in FIG. 10, facial-interface cushion 536 may include a magnetic layer 596 coupled to a cushion layer 537. In at least one embodiment, magnetic layer 596 may be disposed on a display-side surface 598 of cushion layer 537. Magnetic layer 596 may, for example cover a substantial portion of display-side surface 598 of cushion layer 537 such that cushion layer 537 is separated from facial-interface mounting member 534 by magnetic layer 596. In some embodiments, magnetic layer 596 may cover only a portion or portions of display-side surface 598 of cushion layer 537. In one example, cushion layer 537 may surround at least a portion of magnetic layer 596 such that at least a portion of cushion layer 537 abuts facial-interface mounting member 534.

In some embodiments, magnetic layer 596 may be disposed within at least a portion of cushion layer 537 and/or between two or more separate cushion layers of facial-interface cushion 536. In this example, one or more recesses may be defined within at least a portion of cushion layer 537 and/or a cushion layer of facial-interface cushion 536 to accommodate one or more protrusions (e.g., mounting protrusion 158 illustrated in FIG. 6) of facial-interface mounting member 534 so as to position one or more magnetic portions (e.g., mounting-member magnetic element 162 illustrated in FIG. 6) of facial-interface mounting member 534 in close proximity to magnetic layer 596. Additionally or alternatively, a magnetic layer may be disposed on or within at least a portion of facial-interface mounting member 534 in a manner similar to that described above in reference to magnetic layer 596 of facial-interface cushion 536.

In at least one embodiment, at least a portion of facial-interface cushion 536 may be secured to facial-interface mounting member 534 by a magnetic force between magnetic layer 596 and at least a portion of facial-interface mounting member 534. For example, at least a portion of facial-interface cushion 536 may be secured to facial-interface mounting member 534 by a magnetic force between magnetic layer 596 and mounting-member magnetic element 562. As shown, for example, in FIG. 10, a display-side surface 597 of magnetic layer 596 may abut a mounting surface 556 of facial-interface mounting member 534 such that facial-interface cushion 536 is secured to facial-interface mounting member 534 by a magnetic force between magnetic layer 596 and mounting-member magnetic element 562. In some embodiments, facial-interface cushion 536 and/or facial-interface mounting member 534 may include one or more protrusions (e.g., mounting protrusions 158 illustrated in FIGS. 3 and 5-6, mounting protrusion 258 illustrated in FIG. 7, and/or mounting protrusion 459 illustrated in FIG. 9) and facial-interface cushion 536 and/or facial-interface mounting member 534 may include one or more corresponding recesses (e.g. display-side recess 160 illustrated in FIGS. 4-6, display-side recess 260 illustrated in FIG. 7, and/or mounting recess 461 illustrated in FIG. 9) to further position, align, and/or mechanically secure facial-interface cushion 536 with respect to facial-interface mounting member 534.

Magnetic layer 596 may be coupled to cushion layer 537 in any suitable manner (e.g., bonding, fastening, etc.). Magnetic layer 596 may be any suitable size, shape, and thickness. Magnetic layer 596 and/or mounting-member magnetic element 562 may include at least one magnetic and/or ferromagnetic material, without limitation. In one example, magnetic layer 596 may include a ferromagnetic layer, such as a metallic material, that is magnetically attracted to a permanent magnet. In some embodiments, magnetic layer 596 may include a flexible and/or pliable material that is conformable to surface contours of facial-interface mounting member 534, such as contours of mounting surface 556.

Figure 11:
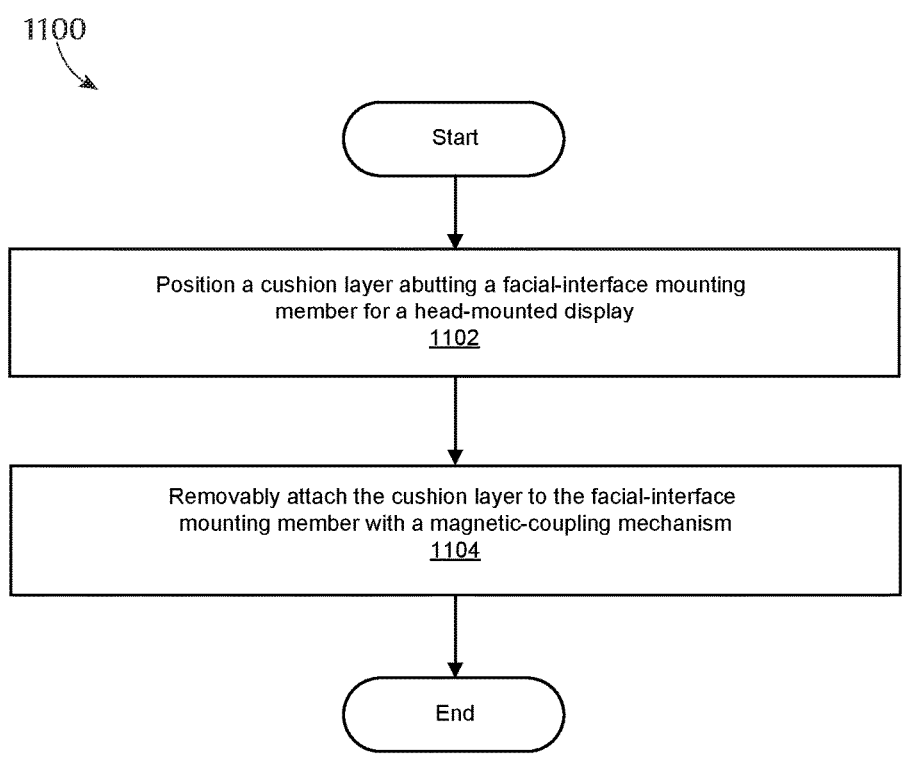
FIG. 11 is a flow diagram of an exemplary method for assembling a facial-interface system for a head-mounted display in accordance with some embodiments.

FIG. 11 is a flow diagram of an exemplary method 1100 for assembling a facial-interface system for a head-mounted display according to any of the embodiments disclosed herein. The steps shown in FIG. 11 may be performed by an individual and/or by any suitable manual and/or automated apparatus.

As illustrated in FIG. 11, at step 1102, a cushion layer may be positioned abutting a facial-interface mounting member for a head-mounted display device. For example, a cushion layer 137 may be positioned abutting a facial-interface mounting member 134, which may include a mounting-member body 154 and a mounting-member magnetic element 162 (see, e.g., FIGS. 2-6).

At step 1104 in FIG. 11, the cushion layer may be removably attached to the facial-interface mounting member with a magnetic-coupling mechanism. For example, a magnetic coupling element 150 may be positioned against a portion of cushion layer 137 such that cushion layer 137 is disposed between magnetic coupling element 150 and mounting-member magnetic element 162 (see, e.g., FIGS. 5 and 6). In one example, cushion layer 137 may be secured to facial-interface mounting member 134 by a magnetic force between magnetic coupling element 150 and mounting-member magnetic element 162, as described in greater detail above.

In some embodiments, positioning the cushion layer abutting the facial-interface mounting member may include positioning a mounting protrusion of the facial-interface mounting member within a display-side recess defined within the cushion layer. For example, a mounting protrusion 158 of facial-interface mounting member 134 may be positioned within a display-side recess 160 defined within cushion layer 137 (see, e.g., FIGS. 3-7). Display-side recess 160 may extend into cushion layer 137 from a display-side surface 152 of cushion layer 137 facing facial-interface mounting member 134. In some embodiments, user-side recess 148 may overlap display-side recess 160 in a direction extending between user-side surface 146 and display-side surface 152.

In some embodiments, removably attaching the cushion layer to the facial-interface mounting member with a magnetic-coupling mechanism may include positioning the cushion layer between at least one magnetic coupling element of the magnetic-coupling mechanism and at least one mounting-member magnetic element of the facial-interface mounting member. For example, cushion layer 137 may be positioned between at least one magnetic coupling element 150 of magnetic-coupling mechanism 147 and at least one mounting-member magnetic element 162 of facial-interface mounting member 134 (see, e.g., FIGS. 2, 5, and 6). In some embodiments, magnetic coupling element 150 may be positioned within a user-side recess 148 defined within cushion layer 137. User-side recess 148 may extend into cushion layer 137 from a user-side surface 146 of cushion layer 137 toward mounting-member magnetic element 162.

In some embodiments, positioning the cushion layer abutting the facial-interface mounting member may include conforming the cushion layer to a mounting surface of the facial-interface mounting member. For example, cushion layer 137 may be conformed to a mounting surface 156 of facial-interface mounting member 134 (see, e.g., FIGS. 2, 6, and 7). Cushion layer 137 may, for example, include a pliable material that is conformable to various shapes and configurations, including contours of mounting surface 156 of facial-interface mounting member 134.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

The foregoing description, for purposes of explanation, has been described with reference to specific embodiments and has been provided to enable others skilled in the art to best utilize various aspects of the example embodiments disclosed herein. However, the illustrative discussions above are not intended to be exhaustive or to limit the scope of the claims to the precise forms disclosed. Many modifications and variations are possible in view of the above teachings without departing from the spirit and scope of the instant disclosure. The instant disclosure covers all modifications, equivalents, and alternatives falling within the scope of the appended claims. Features from any of the above-mentioned embodiments may be used in combination with one another in accordance with the general principles described herein.

The embodiments were chosen to best explain the principles underlying the claims and their practical applications, to thereby enable others skilled in the art to best use the embodiments with various modifications as are suited to the particular uses contemplated. The embodiments disclosed herein should be considered in all respects illustrative and not restrictive. Reference should be made to the appended claims and their equivalents in determining the scope of the instant disclosure.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. The term "exemplary" is used herein in the sense of "serving as an example, instance, or illustration" and not in the sense of "representing the best of its kind." Unless otherwise noted, the terms "connected to," "coupled to," and "attached to" (and their derivatives), as used in the specification and claims, are to be construed as permitting both direct and indirect (i.e., via other elements or components) connection. Furthermore, two or more elements may be coupled together with an adhesive, a clasp, a latch, a hook, a link, a buckle, a bolt, a screw, a rivet, a snap, a catch, a lock, or any other type of fastening or connecting mechanism.

What is claimed is:

1. A detachable head-mounted-display cushion comprising:
   a cushion layer comprising:
      an inner surface surrounding a viewing opening;
      a user-side surface dimensioned to abut a facial portion of a user; and
      a display-side surface dimensioned to abut a mounting surface of a facial-interface system for a head-mounted display; and
   a magnetic-coupling mechanism configured to removably attach the cushion layer to the mounting surface of the facial-interface systems;
   wherein:
      the cushion layer defines a plurality of display-side recesses that are separate from the viewing opening; and
      each of the plurality of display-side recesses extends into the cushion layer from the display-side surface toward the user-side surface and is dimensioned to receive a corresponding mounting protrusion protruding from the mounting surface at an outer region of the facial-interface system.

2. The detachable head-mounted-display cushion of claim 1, wherein the cushion layer defines a user-side recess extending into the cushion layer from the user-side surface toward an adjacent display-side recess of the plurality of display-side recesses, the user-side recess being separated from the adjacent display-side recess by an inner section of the cushion layer.

3. The detachable head-mounted-display cushion of claim 2, wherein the user-side recess overlaps the adjacent display-side recess in a direction extending between the user-side surface and the display-side surface.

4. The detachable head-mounted-display cushion of claim 2, wherein:
   the inner section of the cushion layer comprises:
      a display-side-recess end surface defining an end portion of the adjacent display-side recess closest to the user-side recess; and
      a user-side-recess end surface defining an end portion of the user-side recess located closest to the adjacent display-side recess; and
   the display-side-recess end surface is substantially parallel to the user-side-recess end surface.

5. The detachable head-mounted-display cushion of claim 1, wherein the magnetic-coupling mechanism comprises at least one magnetic coupling element.

6. The detachable head-mounted-display cushion of claim 5, wherein the magnetic coupling element is disposed within at least one user-side recess extending into the cushion layer from the user-side surface.

7. The detachable head-mounted-display cushion of claim 1, wherein the cushion layer comprises a foam material.

8. The detachable head-mounted-display cushion of claim 1, wherein:
   the cushion layer further defines a plurality of user-side recesses; and
   each of the plurality of user-side recesses overlaps an adjacent display-side recess and extends into the cushion layer from the user-side surface toward the adjacent display-side recess.

9. A head-mounted-display system comprising:
   a head-mounted display;
   a facial-interface mounting member for the head-mounted display;
   a cushion layer abutting the facial-interface mounting member, the cushion layer comprising:
      an inner surface surrounding a viewing opening;
      a user-side surface dimensioned to abut a facial portion of a user; and
      a display-side surface abutting the facial-interface mounting member; and
   a magnetic-coupling mechanism removably attaching the cushion layer to the facial-interface mounting member;
   wherein:
      the cushion layer defines a plurality of display-side recesses that are separate from the viewing opening; and
      each of the plurality of display-side recesses extends into the cushion layer from the display-side surface toward the user-side surface and surrounds a corresponding mounting protrusion protruding from an outer region of the facial-interface mounting member.

10. The head-mounted-display system of claim 9, wherein the display-side surface abuts a mounting surface of the facial-interface mounting member.

11. The head-mounted-display system of claim 9, wherein:
   the cushion layer defines a user-side recess extending into the cushion layer from the user-side surface; and
   the magnetic-coupling mechanism comprises a magnetic coupling element disposed within the user-side recess.

12. The head-mounted-display system of claim 9, wherein:

the facial-interface mounting member comprises at least one mounting-member magnetic element;

the magnetic-coupling mechanism comprises at least one magnetic coupling element; and the cushion layer is removably attached to the facial-interface mounting member by a magnetic field between the magnetic coupling element and the mounting-member magnetic element.

13. The head-mounted-display system of claim 12, wherein at least a portion of the cushion layer is disposed between the mounting-member magnetic element and the magnetic coupling element.

14. A method comprising:
positioning a cushion layer abutting a facial-interface mounting member for a head-mounted display, the cushion layer comprising:
an inner surface surrounding a viewing opening;
a user-side surface dimensioned to abut a facial portion of a user; and
a display-side surface dimensioned to abut the facial-interface mounting member; and
removably attaching the cushion layer to the facial-interface mounting member with a magnetic-coupling mechanism;

wherein:
the cushion layer defines a plurality of display-side recesses that are separate from the viewing opening; and
each of the plurality of display-side recesses extends into the cushion layer from the display-side surface toward the user-side surface and surrounds a corresponding mounting protrusion protruding from an outer region of the facial-interface mounting member when the cushion layer is positioned abutting the facial-interface mounting member.

15. The method of claim 14, wherein removably attaching the cushion layer to the facial-interface mounting member with the magnetic-coupling mechanism comprises positioning the cushion layer between at least one magnetic coupling element of the magnetic-coupling mechanism and at least one mounting-member magnetic element of the facial-interface mounting member.

16. The method of claim 14, wherein positioning the cushion layer abutting the facial-interface mounting member comprises conforming the cushion layer to a mounting surface of the facial-interface mounting member.

\* \* \* \* \*